(12) United States Patent
Luo et al.

(10) Patent No.: US 8,447,347 B2
(45) Date of Patent: May 21, 2013

(54) TRANSMISSION OF ORGANIZATIONAL INFORMATION DEPENDING ON THE DIRECTION IN A SYSTEM-WIDE CHANNEL

(75) Inventors: Jijun Luo, München (DE); Jianming Pan, Vienna (AT); Peter Slanina, Judenau (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 813 days.

(21) Appl. No.: 12/310,233

(22) PCT Filed: Aug. 14, 2007

(86) PCT No.: PCT/EP2007/058396
§ 371 (c)(1),
(2), (4) Date: Dec. 31, 2009

(87) PCT Pub. No.: WO2008/020016
PCT Pub. Date: Feb. 21, 2008

(65) Prior Publication Data
US 2010/0113083 A1    May 6, 2010

(30) Foreign Application Priority Data

Aug. 18, 2006   (DE) .......................... 10 2006 038 826

(51) Int. Cl.
*H04M 1/00* (2006.01)
*H04B 7/00* (2006.01)

(52) U.S. Cl.
USPC .................. 455/552.1; 455/553.1; 455/515; 455/550.1

(58) Field of Classification Search
USPC ................... 455/444, 440, 453, 525, 422.1
See application file for complete search history.

(56) References Cited

U.S. PATENT DOCUMENTS

| 5,404,355 | A  | * | 4/1995  | Raith ............................ 370/311 |
| 5,420,911 | A  | * | 5/1995  | Dahlin et al. ............... 455/553.1 |
| 5,822,310 | A  | * | 10/1998 | Chennakeshu et al. ....... 370/317 |
| 6,046,990 | A  | * | 4/2000  | Chennakeshu et al. ....... 370/317 |
| 6,236,856 | B1 | * | 5/2001  | Abbadessa ................... 455/423 |
| 6,414,945 | B1 | * | 7/2002  | Chennakeshu et al. ....... 370/317 |
| 7,324,831 | B2 | * | 1/2008  | Haartsen ................... 455/552.1 |
| 7,555,266 | B2 | * | 6/2009  | Haardt et al. ............... 455/63.1 |
| 2002/0147008 | A1 | * | 10/2002 | Kallio ......................... 455/426 |
| 2003/0162501 | A1 | * | 8/2003  | Haardt et al. .................. 455/63 |

(Continued)

FOREIGN PATENT DOCUMENTS

| EP | 1 441 468 A1 | 7/2004 |
| EP | 1 626 606 A1 | 2/2005 |
| EP | 1626606      | * 2/2006 |

OTHER PUBLICATIONS

P. Cordier, P. Houze, S.B. Jemma, O. Simon, D. Bourse, D. Grandblaise, K. Moessner, J. Lou, C. Kloeck, et al.: "E2R Cognitive Pilot Channel Concept" IST Mobile and Wireless Summit 2006, Jun. 2006, Mykonos, Greece.

(Continued)

*Primary Examiner* — Tilahun B Gesesse
(74) *Attorney, Agent, or Firm* — Staas & Halsey LLP

(57) ABSTRACT

According to the method for transmission of organizational information to at the least two communication systems in a channel via a radio interface, the channel transmitting in a targeted manner and the transmitted organizational information is chosen depending on the direction of the transmission.

16 Claims, 6 Drawing Sheets

U.S. PATENT DOCUMENTS

| | | | |
|---|---|---|---|
| 2005/0020240 A1* | 1/2005 | Minter | 455/404.1 |
| 2007/0004447 A1* | 1/2007 | Haartsen | 455/552.1 |
| 2008/0132233 A1* | 6/2008 | Li et al. | 455/436 |
| 2010/0113083 A1* | 5/2010 | Luo et al. | 455/515 |

OTHER PUBLICATIONS

E. Mohyeldin, J. Lou, J. Pan, P. Slanina: "Common Pilot Method Enabling for Reconfigurable Terminals" 4$^{th}$ Karlsruhe Workshop on software radio (WSR06) Mar. 2006.

Houze P, et al. "Common Pilot Channel for Network Selection" IEEE Vehicular Technology Conference, May 8, 2006, p. 67-71.

P. Cordier, P. Houze, S.B. Jemma, O. Simon, D. Bourse, D. Grandblaise, K. Moessner, J. Lou, C. Klock, et al.: "Cognitive Pilot Channel" Wireless World Research Forum, 15$^{th}$ Meeting WG6, Paris, France, Dec. 2005, p. 1-6.

\* cited by examiner

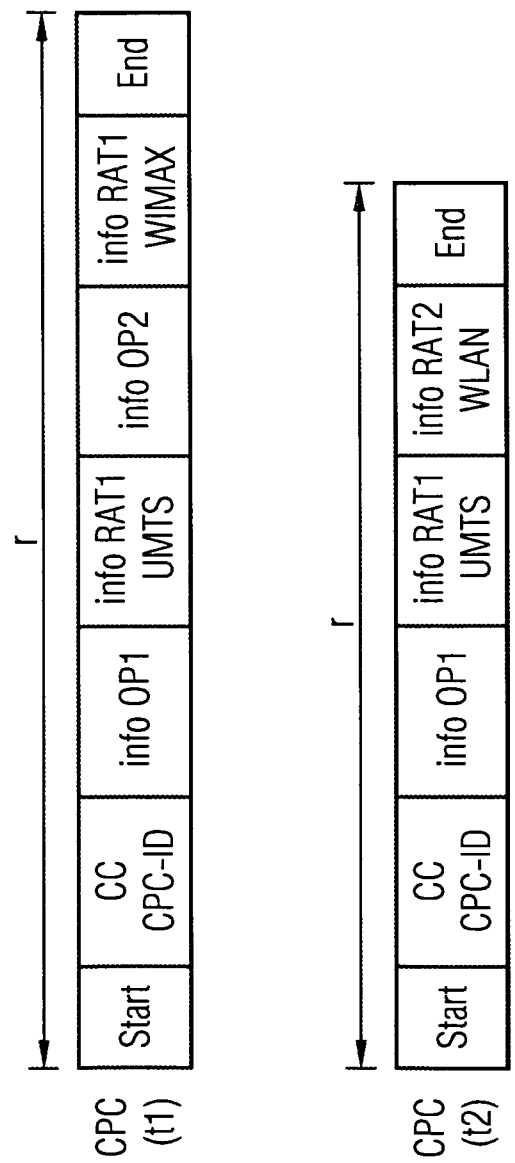

FIG 3A

CPC-o (f1, t1, t2): Start | CC CPC-ID | info OP1, GSM | info OP1, UMTS | info OP2, GSM | info OP2, UMTS | End CPC-d (f2, t1): Start | CC CPC-ID | info OP2, WIMAX | End CPC-d (f2, t2): Start | CC CPC-ID | info OP1, WLAN | End

FIG 3B

CPC (t1): Start | CC CPC-ID | info OP1, GSM | info OP1, UMTS | info OP2, GSM | info OP2, UMTS | info OP2, WIMAX | End
  - CPC-o, CPC-d CPC (t2): Start | CC CPC-ID | info OP1, GSM | info OP1, UMTS | info OP2, GSM | info OP2, UMTS | info OP1, WLAN | End
  - CPC-o, CPC-d

TRANSMISSION OF ORGANIZATIONAL INFORMATION DEPENDING ON THE DIRECTION IN A SYSTEM-WIDE CHANNEL

CROSS REFERENCE TO RELATED APPLICATIONS

This application is based on and hereby claims priority to PCT Application No. PCT/EP2007/058396 filed on Aug. 14, 2007 and German Application No. 10 2006 038 826.7 filed on Aug. 18, 2006, the contents of which are hereby incorporated by reference.

BACKGROUND OF THE INVENTION

The invention relates to a method for the direction-dependent transmission of organization information in a cross-system channel, wherein the organization information relates to radio communication systems.

A continually rising number of different radio communication systems, examples mentioned being the systems based on the standards GSM, IS-95, UMTS, CDMA2000, WLAN (IEEE 802.11) and WiMAX (IEEE 802.16), is resulting in subscriber terminals also supporting an ever greater number of these systems and standards, and thus allowing the subscriber access to communication networks in a wide variety of ways. In addition, operators of radio communication systems are increasingly moving towards providing their customers with systems from different standards, with the option of roaming between these systems.

However, all this can disadvantageously result in the period for a subscriber terminal to set up a connection being extended on account of the large number of available systems, which also usually operate in different system-specific frequency bands. If the subscriber wishes to use, by way of example, a service with a high data rate, an example mentioned being video-streaming, then a service of this kind can potentially be provided by different systems. Provided that the subscriber has not preselected a specific system, during setup of the connection the subscriber terminal makes contact with various systems, or the subscriber terminal first of all attempts to receive signals from various systems—for example of the same operator—and then to select a system which is suitable for the chosen service.

Particularly if the subscriber terminal is started up at a location at which it has not previously been connected to a system and therefore cannot resort to practical values from previous connections, for example when the subscriber is abroad following a flight, the situation may also be aggravated or the access time extended by virtue of it not being known which local operator the home operator has made what is known as a roaming agreement with in order to provide customers with lower connection charges. In this case, the subscriber may repeatedly have a local system or operator proposed, for which the subscriber then needs to decide whether or not to set up a connection.

To provide subscribers or subscriber terminals with a clear overview of the growing number of systems, the document "Global Pilot Mechanism" Tdoc SMG2 UMTS 52/97, ETSI STC SMG2 UMTS adhoc, Apr. 8-10, 1997, Lulea, Sweden, pages 1 and 2, inter alia, has already proposed the introduction of a globally standard pilot channel (Global Pilot Channel) on a standard frequency channel or in a standard frequency spectrum. A global pilot channel of this kind should be used to transfer information about respective locally available radio access technologies (Radio Access Technology Indicator) and pointers (Spectral Pointer) to the spectral situation thereof, so that a subscriber terminal can select and access a suitable or supported radio access technology. In this context, radio access technologies are to be understood to mean systems from different standards, for example GSM and UMTS, which in turn operate in different frequency bands. According to the document above, the pilot channel should be transmitted either by the operators themselves, which accordingly would also need to transmit information from competing operators, or else by a national entity which is not specified in more detail, for example the regulating authority.

However, a globally standard pilot channel has the drawback that as the number of different systems and the expansion thereof to a larger number of frequency bands increases, the signaling load would likewise continually increase. Therefore, a subscriber terminal, having been referred by the pilot channel to the frequency spectrum of the GSM mobile radio system, for example, would also need to perform a large number of measurements for networks of different operators in order to ascertain a suitable operating network for the desired service or tariff or agreement.

SUMMARY

It is therefore one potential object to specify a method and components which allow more efficient operation of a cross-system pilot channel of this kind.

The inventors propose that organization information relating to at least two communication systems is transferred in a channel via a radio interface, wherein the channel is transmitted directionally and the transferred organization information is selected on the basis of the direction of the transmission.

The directionally selective transfer of organization information has the advantage that specifically only the organization information which is of significance to the coverage area of the directional transmission is transferred. This advantageously reduces the volume of organization information, as a result of which evaluation of the received organization information in a subscriber terminal is advantageously speeded up and simplified.

In this context, the channel used for transferring the organization information may be a cross-operator and/or cross-system pilot channel, for example. This means that the channel, for example in the sense of the global pilot channel described in the introduction, transfers organization information relating to all publically available communication systems in its radio coverage area and structures it on an operator-specific basis, for example, or that the channel is transmitted only by the respective operator, for example, so that the organization information transferred therein is limited exclusively to the communication systems supported by the operator or by the roaming partners thereof. The channel can therefore be transmitted by a station which is superordinate to the existing communication systems, for example a broadcast radio transmission station in a public or private broadcast radio system, or else by system stations, for example base stations, in the communication systems of the respective operator.

Advantageously, the proposed method allows adaptive matching of the scope of the organization information to a current load situation in the communication systems. Thus, by way of example, specifically organization information relating to individual radio cells, systems or operators can be hidden or not transferred on a time-dependent basis if they are currently in overload or have just a very high load. This means that a subscriber terminal receiving the channel is not provided with any information about these radio cells, systems or operators for possible access, so that it will also not access them for the purpose of setting up a connection.

Advantageously, the direction-dependent organization information is also provided by a central device in the station transmitting the channel, so that it is possible to react quickly to changes in system configurations. By way of example, the organization information may be either information from network scheduling or continually updated information from the respective system managers, for example O&M (Operation and Maintenance) data from the individual communication systems.

Advantageously, the directional transmission of the organization information is also used to achieve a greater range, since the transmission power available in the transmitting station can be concentrated onto the directional transmission. Furthermore, directional transmission usually results in what is known as an antenna gain.

In line with one development, the organization information transferred in the channel is at least pointers to communication-system-specific and/or operator-specific channels. This additionally allows the volume of organization information to be advantageously reduced and therefore the access times shortened. In this case, the organization information from the channel refers to pilot or broadcast channels, for example, of the respective system or of the respective operator, if the latter is similarly transmitting a channel which covers its supported systems, for example.

In line with a further development, the channel is transmitted by at least one radio access device in a communication system and/or a broadcast radio transmission station in a public or private broadcast radio system. Particularly use of broadcast radio transmission stations provides the advantage in this case that devices which are already present can be used to cover large geographical regions with one radio cell. Long propagation times for the transmitted signals, possibly caused by the size of the radio cell, do not have a negative effect in this case, since the signal transfer takes place exclusively in the downlink, i.e. towards the subscriber terminals.

In line with a further development, the directional transmission is effected by adaptive beamforming, a switched beam or sectorization. In this case, a switched beam may be configured in the known manner. By contrast, adaptive beamforming can be implemented using what are known as smart antennas or antenna arrays, for example. Sector antennas, for example three antennas with a respective solid angle of 120°, in turn are already known from use in known radio communication systems.

By selecting the width of the beam or of the solid angle which is covered by the beam or sector, it is possible to set the volume of organization information transferred therein, for example, so that a volume of organization information which a subscriber terminal can process in optimum fashion is transferred. This selection of the width of the beam or of the solid angle can also be made adaptively in this case, for example in an overload situation as described above or when further systems are added. Preferably, receiving subscriber terminals are informed about a periodicity of the transmission of the channel in a particular direction, for example by a special piece of information in the channel, so that the subscriber terminals do not have to receive the channel constantly but rather can receive it only at the times at which the channel is also receivable at its current location. For the rest of the time, the subscriber terminals can switch off the reception devices using what is known as a Discontinuous Reception procedure and can thereby advantageously save power.

In addition, the organization information in the beam or the solid angle can also be transferred under time control. By way of example, this is done by virtue of the beam pointing in one particular direction or a particular sector being active at a first time while the beam points in another direction or another sector is active at a later second time. In this case, it is conceivable to have transmission in the sense of a revolving beam, in similar fashion to the beam of light from a lighthouse. This can advantageously reduce the reciprocal interferential influencing of adjacent radio cells despite the use of the same frequencies, since the beams or sectors from adjacent radio cells do not overlap at one time. In this case, it is also conceivable to have simultaneous transmission at two or more solid angles, but likewise with the aim of reduced interferential influencing of adjacent radio cells. The width of the beam or of the sector and the period of time which the beam or the sector can be received at a location are dependent on the volume of organization information to be transferred, and it should preferably be ensured that a subscriber terminal receiving the channel can fully receive the organization information transferred therein periodically, for example, during this period of time.

In line with a further development, the channel is split into at least two subchannels, wherein a first subchannel is used to transfer organization information about universally implemented communication systems and a second subchannel is used to transfer organization information about locally implemented communication systems.

In this case, this split can be made logically, for example using a time structure for the channel in which a transfer frame—repeatedly transferred periodically—is first of all used to transfer organization information relating to universally implemented communication systems, followed by organization information relating to locally implemented communication systems. This means that for a subscriber terminal receiving the channel which supports only universally implemented communication systems such as GSM or UMTS, for example, it is advantageously sufficient to receive and evaluate only the organization information which concerns it in order to additionally speed up the resultant selection of a suitable system and access to this selected system.

However, a physical split is also conceivable, in line with a further development in the form of different frequency channels for the respective organization information relating to universally and locally implemented communication systems, for example. Advantageously, as in the example described above, it is possible for a subscriber terminal which supports merely universally implemented communication systems to access the frequency channel with the organization information comprising these communication systems.

Alternatively or in addition, it is also conceivable to have a three-dimensional split, for example by transmitting the respective organization information in different directions at one time.

In line with a refinement which is based on the developments above, the organization information relating to universally implemented communication systems is transmitted omnidirectionally, while organization information relating to locally implemented communication systems is transmitted directionally. This allows a subscriber terminal to have constant access to the organization information relating to universally implemented communication systems, which in turn allows the selection and the access to a selected system to be speeded up.

In line with a further development, the cross-system channel is additionally used to transfer information about a direction for the transmission. Advantageously, this information can be used by a receiving subscriber terminal, for example to carry out position finding. To this end, it is necessary to receive information—for example in the form of a relative or absolute angle—from two or three such channels from different stations and to know the positions thereof, for example, in order to calculate an absolute or relative position for the subscriber terminal therefrom. This information may be part of a piece of identification information from the channel, for example by virtue of the identification information being selected or changed on the basis of direction. In addition, the information can be used, by way of example, to generate feedback information from a subscriber terminal and to provide said feedback information to indicate this information or a calculated position for the subscriber terminal, as described below.

In line with a further development, the cross-system channel is used to transfer information concerning geographical arrangements of the radio communication systems. In this case, such information concerning geographical arrangements may be geographical coordinates, for example, which define the geographical extent of the coverage area. It is also possible to have details relating to locations of system stations, which the subscriber terminal can use to estimate whether it is potentially in the coverage area of a system station.

This development advantageously allows a subscriber terminal to specifically select and access a system which is also available at the current location of the subscriber terminal. This makes sense, inter alia, for merely locally available systems, which sometimes have only a small coverage area in comparison with the coverage area of the directional transmission. The example assumed is a local WLAN system comprising a small number of network access points with a total coverage area of a few square kilometers, which has organization information transmitted for it in a channel with a range of 50 kilometers. In such a case, the subscriber terminal can use the information relating to the geographical arrangement of the WLAN system to check whether it is currently in the coverage area thereof and, if this is the case, to perform further measurements for it and finally to access it. If it is currently not in the coverage area, however, it can rule out this system for a possible access and instead select a locally available system. This in turn advantageously speeds up the subscriber terminal's access to an available system, since failed attempts when accessing a system which is not available are avoided.

In line with a further development, a subscriber terminal receiving the cross-system channel compares the organization information in the cross-system channel with measurements performed by the subscriber terminal. Next, ascertained differences are signaled from the subscriber terminal to the station transmitting the cross-system channel, and/or the station with a radio link to the subscriber terminal, in a communication system.

In this case, the measurements performed by the subscriber terminal may be field strength measurements for channels from system stations, for example, which are supposed to be available at the current location of the subscriber terminal according to the organization information. If the subscriber terminal establishes that, by way of example, a statement about a geographical coverage area of a system or of a station in the system is not correct, i.e. the subscriber terminal cannot receive signals from the system or cannot receive them with sufficient quality, even though this should be the case according to the organization information, then it signals these findings as feedback information, which can be taken into account in the entity managing the organization information as appropriate for future transmissions of the organization information.

To this end, it makes sense for the subscriber terminal to signal details concerning its current position together with the feedback information. These may be absolute details, for example geographical coordinates calculated by satellite positioning methods such as GPS or Galileo, or else relative details, for example details relating to times at which one or more cross-system channels have been received, or relating to channel identifications, from which directions can be determined and the system can calculate the location of the subscriber terminal, which is then associated with the feedback information. Alternatively, an appropriate piece of information about a direction can also be determined by the system, for example by virtue of the additional piece of information, described above, about the direction of the transmission being implemented by an absolute or relative time statement. If the subscriber terminal receives the cross-system channel together with a channel identification and also a time statement of this kind then these data can be used by the network to ascertain the direction in which the channel was transmitted at the time of reception by the subscriber terminal.

Depending on how the cross-system channel is transmitted, for example, the feedback information is signaled by the subscriber terminal to different stations. If the channel is transmitted by a broadcast radio transmission station with a large transmission range in a downlink, for example, a subscriber terminal will usually not be able to transfer feedback information to this broadcast radio transmission station in the uplink, since its transmission range is significantly smaller on account of the limited transmission power. In addition, broadcast radio transmission stations usually also have no reception devices, but rather transmit signals exclusively in the downlink. In this case, the subscriber terminal can transfer the feedback information to a station in a selected system, for example after a connection has been set up to said station, from where it is forwarded to the entity managing the organization information.

As an alternative to the generation of feedback information by a subscriber terminal, this can also be done by system stations. This requires system stations to be equipped with system-specific receivers, for example including receivers which can be configured for different system standards by software, known as software radio, which are able to be used to ascertain an availability for adjacent systems at the respective location of the system station and to forward appropriate feedback information to the central entity.

Components according to the invention have respective devices which allow the method described above and refinements thereof to be implemented.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows the structure of a frame for a cross-system channel,

FIGS. 3a, 3b show a frame structure for physically or logically split cross-system channels.

DETAILED DESCRIPTION OF THE PREFERRED EMBODIMENT

Figure 1:
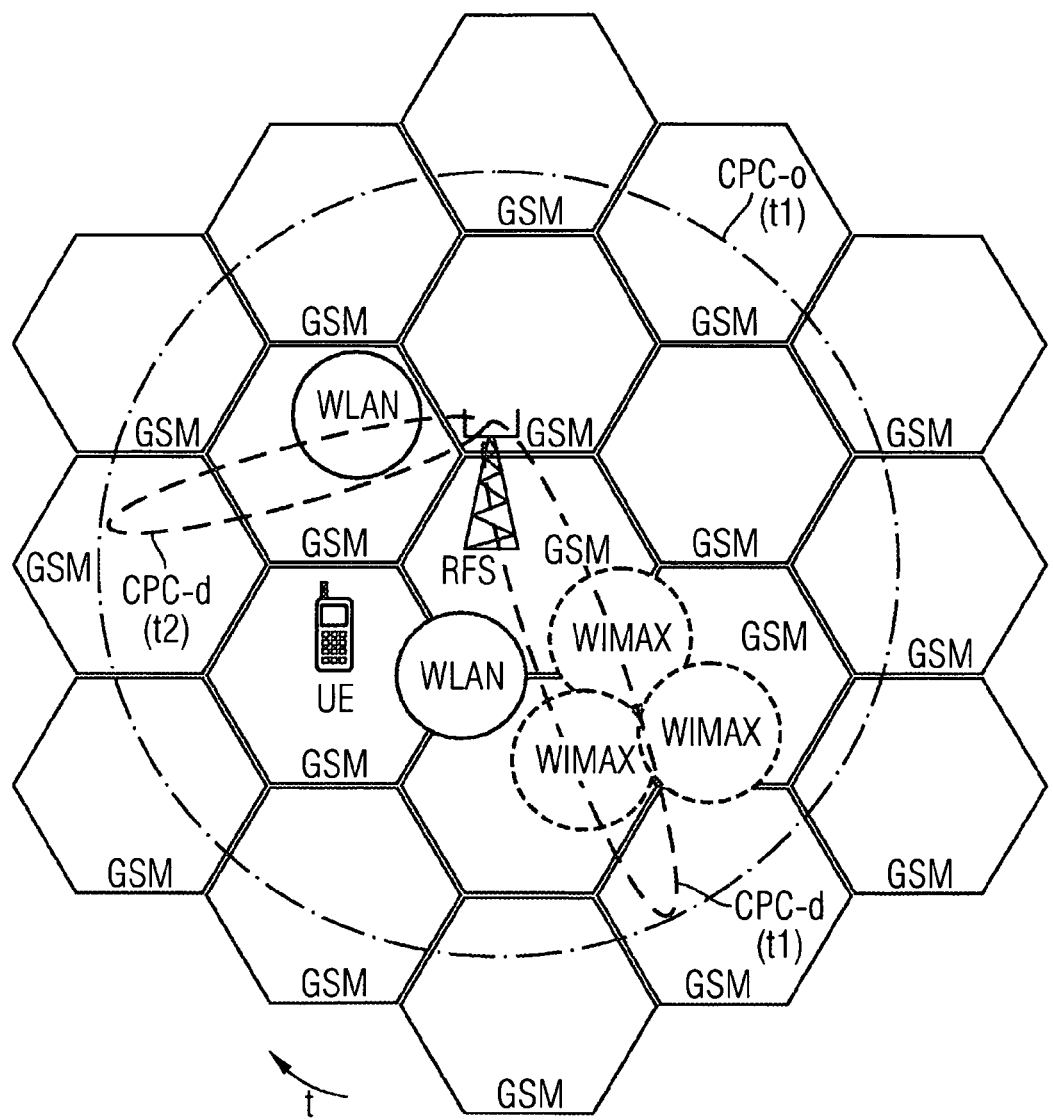
FIG. 1 shows coverage areas for various systems and channels.

Reference will now be made in detail to the preferred embodiments of the present invention, examples of which are illustrated in the accompanying drawings, wherein like reference numerals refer to like elements throughout.

FIG. 1 shows an example of the coverage area of a cross-system channel CPC. It is assumed that the cross-system channel CPC (Common Pilot Channel), as a globally standard pilot channel—cited in the introduction—on the national territory of a country, for example the Federal Republic of Germany, is used to transmit organization information about the operators and radio communication systems operating in the national territory. This cross-system channel CPC is broadcast by public or private broadcast radio transmission stations RFS, for example, in order to ensure nationwide receiveability which is as universal as possible. This can be done in line with a cellular system, i.e. using a multiplicity of broadcast radio transmission stations RFS which cover a respective subarea, wherein the use of a frequency band which is the same nationwide involves the individual radio cells being separated, for example by CDMA (Code Division Multiple Access) separation. Known principles of what are known as common-frequency systems can be applied in the same way.

In line with the proposal, described in the introduction, for implementing a global pilot channel, a cross-system channel CPC of this kind is preferably organized on the basis of a globally standard structure, i.e. it is broadcast in a standard frequency band or in a limited number of possible frequency bands, and uses a standard-configuration radio interface, i.e. standard encoding, modulation, etc. This advantageously allows rapid and secure access to this channel by subscriber terminals.

In the area of a nation, a multiplicity of operators normally operate radio communication systems which respectively also support a plurality of different system standards. As a representation of the coverage area of a first operator OP1, FIG. 1 shows radio cells in a mobile radio system based on the GSM standard and radio cells in a wireless local line distribution network based on the WLAN standard (IEEE 802.11) by way of example. For an operator operating nationwide, its radio coverage area in the GSM system would almost correspond to that of broadcast radio transmission stations RFS, so that, as an alternative to the broadcast shown using the broadcast radio transmission stations RFS, the cross-system channel CPC can be transmitted by system stations of the operators themselves.

Besides the first operator OP1 operating nationwide, FIG. 1 also shows, by way of example, the coverage area of a second, locally operating operator OP2 with radio cells in a wireless line system based on what is known as the WiMAX standard (IEEE 802.16).

By way of example, a subscriber terminal UE (User Equipment) is also shown which is both in the radio coverage area of the cross-system channel CPC and in a radio cell in the GSM system of the first operator OP1. For subsequent explanations, it is assumed that the subscriber terminal UE is technically designed to support the three standards cited by way of example, the method being able to be carried out in the same way for subscriber terminals which support any number of different standards.

In the exemplary situation in FIG. 1, it is also assumed that the subscriber terminal UE is being switched on or started up for the first time. This happens after the terminal has been purchased by the subscriber or following arrival at the airport after a journey from a different country or after the subscriber terminal has been out of use for a relatively long time, for example. To make initial contact with a system which is available at the current location of the subscriber terminal UE, the subscriber terminal UE will first of all tune itself to the frequency band of the cross-system channel CPC, receive said channel and evaluate organization information therein relating to available operators and systems, and also subsequently select a suitable operator, or an operator prescribed on the basis of operator information or roaming agreements of operators stored on the SIM card, for example, and a system supported by said operator. In this case, the frequency band and the access technology of the cross-system channel CPC is preferably known to the subscriber terminal UE per se, as mentioned above, so that specific and rapid access to this channel CPC can take place.

A cellular structure of the cross-system channel CPC, as described above, advantageously allows regional or local specifics to be taken into account, and the volume of information which is to be transferred in the channel to be limited as a result. First, by way of example, if an operator or system is limited locally and hence operates exclusively in a particular one of the multiplicity of cells of the cross-system channel CPC, it is possible for organization information to be transmitted in this cell, whereas, in all other cells of the cross-system channel CPC that do not have this operator or this system operating in them, no kind of organization information relating to this operator or system is transmitted. A similar situation would apply if an operator operates wireless local line distribution networks exclusively in urban areas, for example. In this case, it would be sufficient for only the cells of the cross-system channel CPC which comprise the affected urban areas to transmit organization information about this operator and its wireless local line distribution network.

The subscriber terminal UE is referred to the selected system, preferably again by a pointer to a system-specific pilot channel, synchronization channel or control channel which is contained in the organization information for the cross-system channel CPC. The term pilot channel is subsequently used as a synonym for such system-specific channels.

To simplify the description, FIG. 1 shows only radio cells from three systems and two operators. However, it is clear that further universally or locally implemented systems from the same or further operators can exist in reality, which means that local overlaps between different systems arise, but these systems are usually separated by using different frequency bands.

FIG. 1 also shows directional broadcast of the cross-system channel CPC by way of example. In this case, beamforming is effected according to known principles, for example using what are known as smart antennas, which allows more or less smooth tracking of the beam, using what is known as a switched beam, which allows orientation of the beam in discrete steps, or using sector antennas, which respectively illuminate a constant solid angle (shown by way of example in FIG. 5). The width of the beam shown in FIG. 1, which is used to transmit the cross-system channel CPC, has what is known as a main lobe or a main beam, is merely an example, i.e. it can be proportioned on the basis of the physical properties of the antennas or else the volume of organization information to be transferred and the period of time in which the channel CPC is broadcast in a particular direction by the broadcast radio transmission station RFS, for example.

In the example in FIG. 1, it is assumed that the cross-system channel CPC is transmitted in a first direction or at a first solid angle at a first time t1, whereas it is transmitted in a second direction, which is different from the first direction, at a second time t2. By way of example, this is done as a revolving beam or on the basis of a particular pattern, so that within a particular period of time the cell is illuminated completely with the beam. Alternatively or in addition, it can also be transmitted in at least two or else all directions at one time, for example on the basis of the method used to counteract reciprocal interferential influencing between adjacent cells and beams, as explained in more detail with reference to FIGS. 4 and 5.

According to the proposed method and devices, the organization information relating to subscribers and/or systems which is transferred in a cross-system channel CPC is selected on the basis of the direction of the transmission of the cross-system channel CPC. In accordance with the example in FIG. 1, the cross-system channel CPC would transfer organization information relating to the GSM system of the first operator and the WiMAX system of the second operator at the time t1, since these systems and operators are covered by the beam. At the time t2, on the other hand, the cross-system channel CPC would transfer organization information relating to the GSM system and the WLAN system of the first operator, since only these systems and only the first operator are covered by the beam at this time.

FIG. 2 shows the structure of a transmission frame r of the cross-system channel CPC and of the content thereof at the exemplary times t1 and t2 by way of example. It is conceivable to extend the transmission frame r by fields other than those shown or to have a different structure, but without any significance to this discussion. The transmission frame r is preferably transferred with periodic recurrence, and direction-dependent transmission within time limits, as described above, should allow a transmission frame to be received in full by a receiving subscriber terminal UE in order to ensure that the subscriber terminal UE can receive and evaluate all the organization information transferred therein.

The transmission frame r is limited by a start and end field End. This ensures that, despite the channel CPC being of different lengths in time on account of the direction-dependent different volume of organization information, as shown by way of example in the two frames in FIG. 2, a receiving subscriber terminal UE can detect the length of the transmission frame r. A standard length for the transmission frame r is conceivable in the same way, however. In this case, it is possible to dispense with an end field End. By way of example, a standard length can be achieved by what is known as filling information, i.e. if less than a standard volume of organization information needs to be transferred then surplus fields are filled with redundancy information or information without any significance.

The start field Start of the transmission frame r is followed by a field containing details relating to what is known as a country code and relating to a piece of identification information CPC-ID, which a receiving subscriber terminal UE can use to identify which cross-system channel CPC it is currently receiving, for example. This is necessary particularly for the case in which the subscriber terminal UE is in a coverage area for a plurality of cross-system channels and needs to select a suitable one of these channels. The country code CC can be used by the subscriber terminal UE in order, for example, to perform alignment with country-specific information stored in the terminal or the SIM card, for example concerning roaming agreements with the home operator, so as subsequently to select a suitable operator or system.

The subsequent fields of the transmission frame r are used to transfer organization information relating to operators and systems which are available within the geographical coverage area of the cross-system channel CPC. In accordance with the example in FIG. 1, the transmission frame r is used to transfer, at the time t1, first of all information info relating to the first operator OP1, for example a specific operator identifier or piece of operator identification information, and then information info relating to the radio access technology RAT1 supported by this operator OP1, in this case the GSM system GSM. Accordingly, the transfer of a field containing information info relating to the second operator OP2 is followed by the transfer of a field containing information info relating to the radio access technology RAT1 supported by said operator, in this case relating to the WiMAX system WIMAX. As an alternative to the structure shown, these fields can also be combined, i.e. each field containing details relating to a system is used to transfer a piece of information about the operator supporting this system, for example, as shown by way of example in FIG. 3. The information info relating to the operators and systems may be in the form of pointers to operator-specific and system-specific channels or frequency bands in which said information is transmitted, for example.

At the second time t2, the transmission frame r shown underneath, which is shorter than at the time t1 on account of the smaller volume of organization information, is used to transfer exclusively information relating to the first operator OP1 and the GSM and WiMAX systems supported thereby, in contrast to the transmission frame r at the time t1, since a system belonging to the second operator is not available within the coverage area of the cross-system channel CPC.

FIG. 3 shows alternative structures, in comparison with the structure described above, for transmission frames when the cross-system channel CPC is split into physically or logically separate subchannels. In this case, the structure of the subchannels in FIG. 3*a* is based on the assumption that the cross-system channel CPC is split into a first subchannel CPC-o, which is used to transfer exclusively organization information relating to universally implemented systems, and a second subchannel CPC-d, which is used to transfer exclusively organization information relating to merely locally implemented systems. It is also assumed that the subchannels use respective different frequency bands f1, f2, and that the first subchannel CPC-o is broadcast omnidirectionally, whereas the second subchannel CPC-d is broadcast directionally. This is shown by way of example in FIG. 1. Whereas the first subchannel CPC-o is broadcast in the entire cell of the broadcast radio transmission station RFS at the first time t1, the second subchannel CPC-d is broadcast in the illustrated direction at the first time t1 and in an illustrated different direction at the second time t2.

According to FIG. 3*a*, the transmission frame r of the first subchannel CPC-o, which is transmitted in a first frequency band f1, is therefore used at the times t1 and t2 to transfer not only a piece of identification information CPC-ID for the first subchannel CPC-o but also organization information relating to the universally available systems based on the GSM and UMTS standards of the first OP1 and second OP2 operators in the cell of the broadcast radio transmission station RFS (cells in the GSM system of the second operator OP2 and in the UMTS systems not shown in FIG. 1). By contrast, the directionally broadcast second subchannel CPC-d is used to transfer different organization information at the times t1 and t2 on the basis of direction. Thus, the transmission frame of the second subchannel CPC-d contains merely organization information relating to the WIMAX system of the second operator OP2 at the first time t1, whereas at the second time t2 it contains organization information relating to the WLAN system of the first operator OP1.

Besides physical separation of the subchannels CPC-o, CPC-d through the use of different frequency bands f1, f2, it is also conceivable, as shown by way of example in FIG. 3b, to have purely logical or temporal separation of the subchannels. Thus, at the exemplary first time t1 in FIG. 1, the first subchannel CPC-o is first of all used to transfer organization information relating to the universally available systems based on the GSM and UMTS standards of the first OP1 and second OP2 operators, and only following these fields of the channel CPC is a field of the second subchannel CPC-d transferred with organization information relating to the WIMAX system of the second operator OP2, which is available in the coverage area of the channel CPC. Accordingly, the transmission frame shown underneath is configured at the second time t2, again with the difference over the top frame that the coverage area of the channel CPC has only the WLAN system of the first operator OP1 available at this exemplary second time t2. Upon directional transmission of the cross-system channel CPC in line with the illustration in FIG. 1, the transmission frame comprises a more or less static portion, the first subchannel CPC-o, which is not subject to any or barely any changes of content on account of the exclusive concentration on universally available systems, and a variable portion, the second subchannel CPC-d, which contains organization information configured on the basis of direction.

A subscriber terminal UE, which supports exclusively universally implemented systems based on the GSM and/or UMTS standards, for example, can therefore be limited to the reception of the content of the first subchannel CPC-o, and hence advantageously shorten the time for the selection and for accessing a selected system. In this regard, it makes sense for, as shown, a transmission frame to be used first of all to transfer organization information relating to universally implemented systems and only then to transfer organization information relating to merely locally implemented systems.

As separate information in the first field of a transmission frame or as part of the identification information CPC-ID from the directionally transmitted cross-system channel CPC or from the second subchannel CPC-d, it is additionally possible for a piece of information about a current direction for the transmission to be signaled to the receiving subscriber terminal (not shown in figures). In this context, this information may be, by way of example, an indication of a relative angle, for example in the sense of relative to a particular prescribed angle or a particular direction, or of an absolute angle, the angles preferably being divided into discrete value ranges on the basis of the width or the solid angle of the directional broadcast. This enables a subscriber terminal receiving this information from two or three channels of adjacent cells and knowing the positions of the stations transmitting these channels to determine its position. It is likewise conceivable for the subscriber terminal to signal the received direction information to a system following successful connection thereto, said system then calculating the position of the subscriber terminal on the basis of this information.

The information about the current direction of the transmission can be implemented using a piece of identification information for the channel CPC-ID, which information is chosen or altered on the basis of direction, for example. As described in more detail below, position finding of this kind can be used, by way of example, to generate position-dependent feedback information for updating organization information in the cross-system channel CPC.

The fields of a transmission frame r of the cross-system channel CPC which are indicated by way of example in FIGS. 2 and 3 can also contain information concerning geographical arrangements of the respective radio communication system (not shown in figures). By way of example, this information may be geographical coordinates which define the geographical extent of the coverage area. It is also conceivable, particularly in connection with a transmission frame as shown in FIG. 2, for there to be an indication merely of the fact that a universally or a merely locally implemented system is involved. Alternatively or in addition, it is also conceivable to have details relating to locations of system stations, which can be used by the subscriber terminal to estimate whether it is potentially in the coverage area of a system station.

This additional information allows a subscriber terminal targeted selection and access to a system which is also available at the current location of the subscriber terminal. This makes sense, inter alia, for merely locally available systems, which sometimes have only a comparatively small coverage area. Such a system may be the local WLAN system shown by way of example in FIG. 1, this system comprising a small number of network access points and just has a total coverage area of a few square kilometers. It is thus probable that a subscriber terminal UE receiving the cross-system channel CPC with an exemplary range of 50 kilometers will not be in the coverage area of the WLAN system, as shown by way of example in FIG. 1, or will therefore not be able to access it. In this case, the subscriber terminal UE can use the information relating to the geographical arrangement of the WLAN system in the cross-system channel CPC to check whether it is currently in the latter's coverage area and, if this is the case, to perform further measurements relating thereto and finally to access it. If it is not currently in the coverage area thereof, however, it can exclude this system for possible access and instead select a system which is available at the current location, for example the GSM system.

Figure 4:
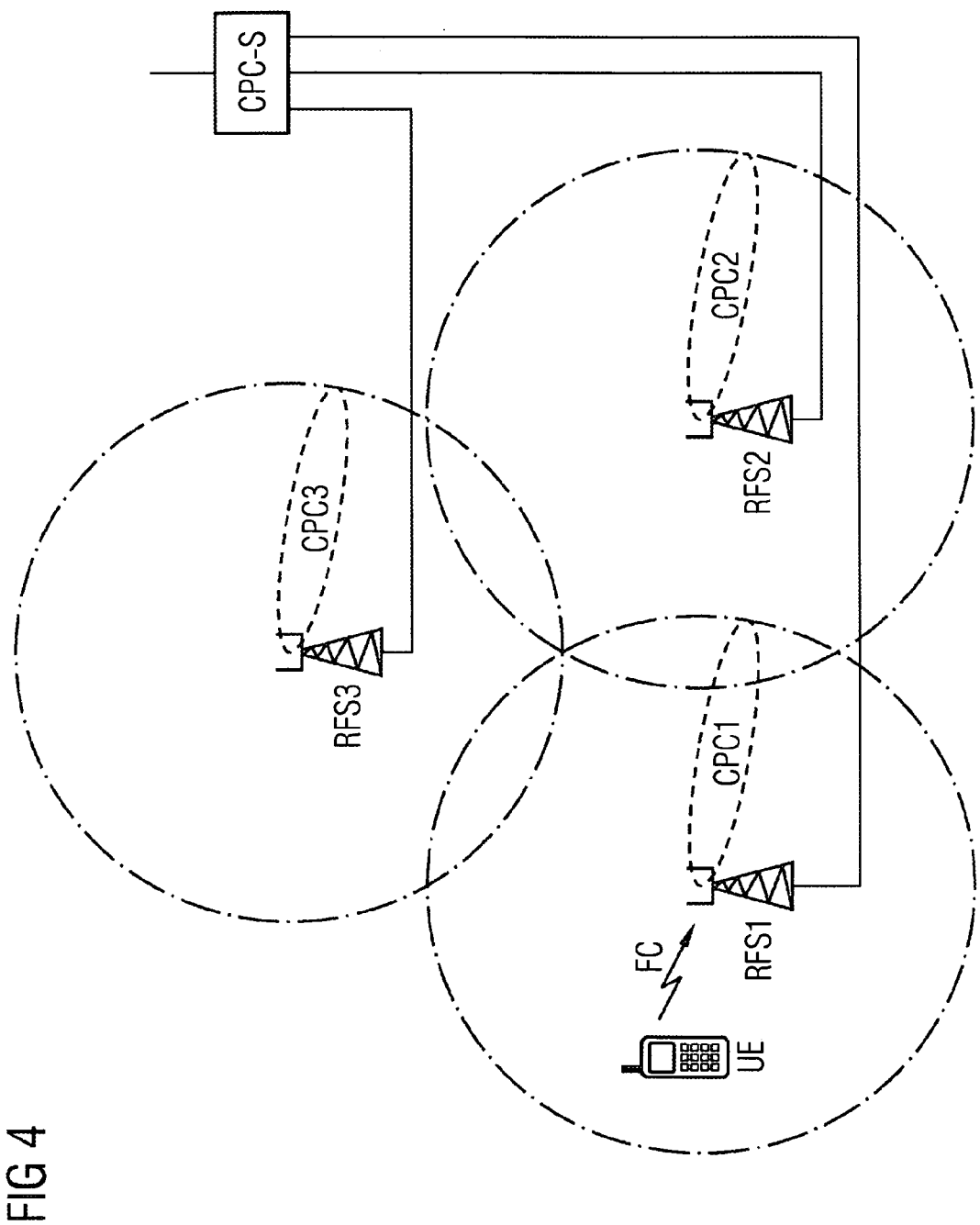
FIG. 4 shows coordinated transmission of cross-system channels by adjacent stations.

FIG. 4 shows an example of the coordination of the directional broadcast of the cross-system channel CPC1, CPC2, CPC3 in adjacent radio cells. In this case, it is assumed that the radio cells correspond, in principle, to the structure of the example in FIG. 1. In order to be able to use the same frequency band for transmitting the cross-system channel in adjacent radio cells, the channel is broadcast directionally by the broadcast radio transmission stations RFS1, RFS2, RFS3 such that, by way of example, these stations broadcast in the same direction in coordinated fashion at one time. This advantageously avoids reciprocal negative influencing by the channels CPC1, CPC2, CPC3, and subscriber terminals UE also only ever receive one cross-system channel at a time. As an alternative to broadcasting in a same direction, it is also possible to choose different directions. In any case, the aim is for the transmissions not to overlap at the location of a subscriber terminal.

Figure 5:
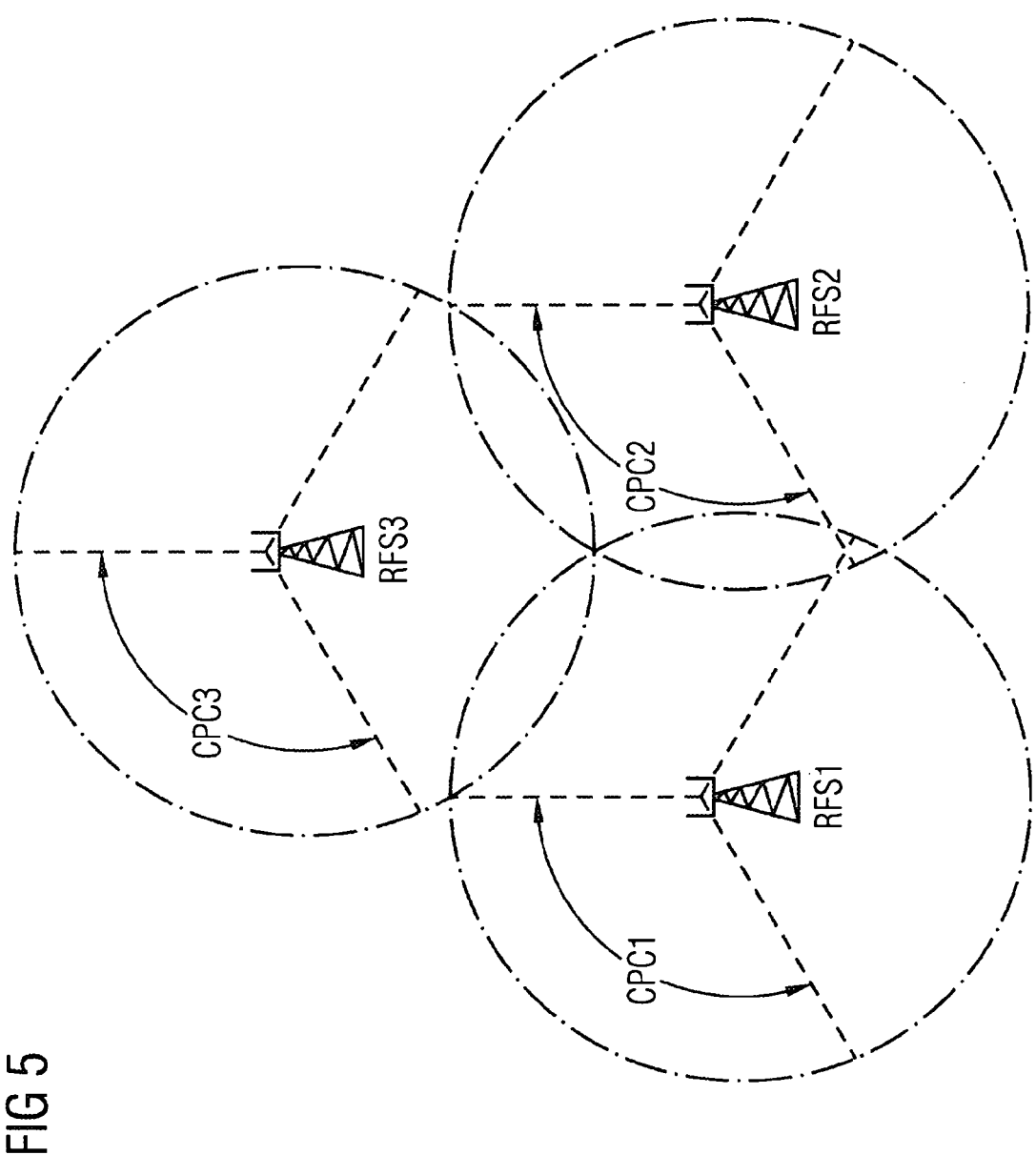
FIG. 5 shows alternative coordinated transmission of cross-system channels.

FIG. 5 shows an alternative embodiment to the directional broadcast in FIG. 4 which is implemented using what are known as smart antennas or switched beams, for example. In FIG. 5, it is assumed that the antenna devices of the broadcast radio transmission stations RFS1, RFS2, RFS3 each have three sector antennas which are used to cover 120° sectors, respectively. The cross-system channels CPC1, CPC2, CPC3 are broadcast accordingly in these sectors. The exemplary broadcast of the cross-system channel in the three adjacent radio cells is coordinated, in accordance with FIG. 5, such that the stations broadcast in the same sector at one time. This ensures that the transmissions of the adjacent stations do not overlap at the location of a subscriber terminal and hence do not cause any interference which adversely affects the reception quality.

FIG. 4 also shows, by way of example, that broadcast radio transmission stations RFS1, RFS2, RFS3 transmitting the cross-system channel CPC are connected to a central device, what is known as a CPC server CPC-S. This CPC server CPC-S provides the direction-dependent information which is to be transferred in the cross-system channel on the basis of the description above. In addition, this server can also control the directional transmission, i.e. the coordination of the direction in which adjacent broadcast radio transmission stations RFS1, RFS2, RFS3 are intended to send at one time. It is likewise conceivable for a plurality of system-individual or operator-individual CPC servers CPC-S to be provided, i.e. for each system standard and/or operator to have a database generated for it in which the directional-dependent organization information is held and made available for the transmission of the cross-system channel CPC.

In addition, FIG. 4 also shows what is known as a feedback channel FC, which can be used by a subscriber terminal UE for transmitting feedback information. In this case, the feedback channel FC exists between the subscriber terminal UE and the broadcast radio transmission station RFS1 as the station transmitting the cross-system channel CPC1. Alternatively, as shown in FIG. 5, the feedback channel FC can exist in the same way between the subscriber terminal UE and a system station BS UMTS to which the subscriber terminal UE has set up a connection, however. Since the range of the transmission of a broadcast radio transmission station RFS is usually much greater than the range of the transmission of a subscriber terminal, it appears more advantageous to transfer feedback information relating to a system station to which the subscriber terminal sets up a connection. In addition, broadcast radio transmission stations, which are usually not equipped for receiving signals, need to be equipped with appropriate devices for receiving the feedback channel.

A subscriber terminal generates feedback information by comparing organization information received in the cross-system channel CPC and measurements which it has performed. The feedback information is used to update or correct the direction-dependent organization information, for example in the CPC server. If, as in the example in FIG. 1, the subscriber terminal UE were to receive organization information in the directionally transmitted cross-system channel CPC-d about the fact that a WLAN system is available at the current location, measurements, for example reception strength measurements, on pilot channels in this system would lead to the result that, contrary to the content of the organization information, there is actually no WLAN system available. Together with information about the current position, the subscriber terminal would signal this finding to the broadcast radio transmission station RFS or a system station, the location information also being able to be ascertained on the basis of a method as described above.

In addition or as an alternative to generation of feedback information by subscriber terminals, said information can also be generated by system stations themselves. To this end, the system stations need to be provided with reception devices for receiving the cross-system channel CPC and system-specific channels such as pilot channels. In this case, the reception devices can be configured for different system standards on the basis of the principles of what is known as software radio, for example, i.e. reception devices which can be configured individually by software module. The feedback information generated by the system stations is then signaled to the broadcast radio transmission system RFS transmitting the cross-system channel CPC, for example, in a feedback channel FC or else directly to the CPC server CPC-S.

Figure 6:
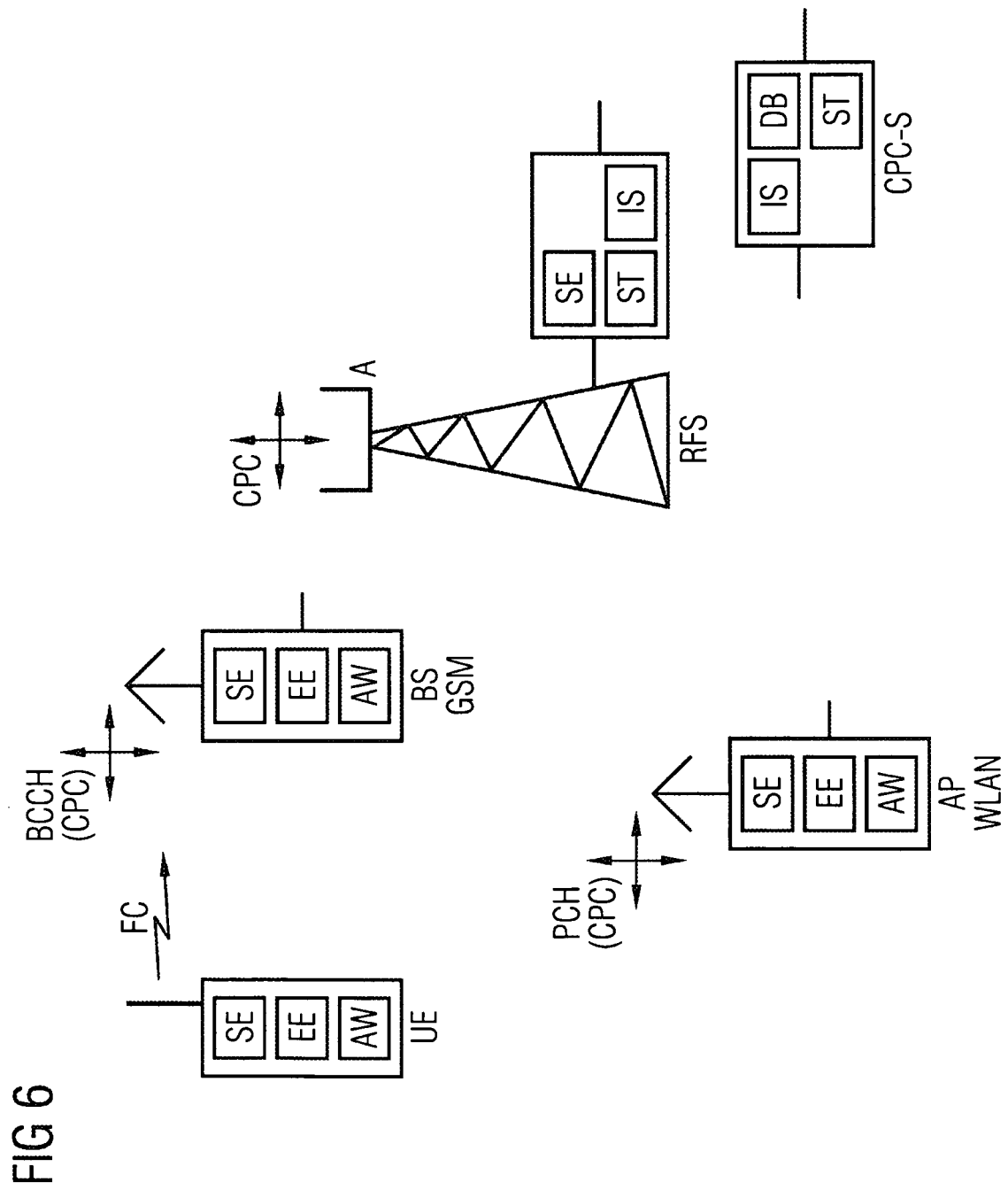
FIG. 6 shows an arrangement of system components.

Finally, FIG. 6 shows components of various systems and also devices implemented therein. The exemplary situation of FIG. 1 will again be assumed. A subscriber terminal UE is in a coverage or radio coverage area of both a broadcast radio transmission station RFS and a base station BS in a GSM mobile radio system. The radio coverage area, also called a radio cell, is normally determined on the basis of a prescribed reception quality or a reception level at which a transmitted channel can be received. Such a channel is what is known as a broadcast channel BCCH (Broadcast Control Channel) on the basis of the GSM standard, and what is known as a Pilot Channel PCH, for example, on the basis of the WLAN standard. For the illustrated case of transmission of the cross-system channel CPC by a broadcast radio transmission station RFS, this would accordingly be the cross-system channel CPC.

Besides an antenna device A, which, by way of example, is in the form of one or more smart antennas, in the form of one or more antennas for switched beams, in the form of what is known as an antenna array, or in the form of sector antennas, and which is shown by way of example as being implemented on a mast, the broadcast radio transmission station RFS has at least one transmission device SE for the directional transmission of the cross-system channel CPC. In this case, the transmission device SE comprises one or more power amplifiers, devices for converting baseband signals into one or more radio frequency bands used, and known devices for controlling the directional broadcast of the cross-system channel CPC, for example. A control device ST in the broadcast radio transmission station RFS controls selection of the organization information to be transferred on the basis of the direction of the transmission, so that when the cross-system channel CPC is transmitted in a particular direction, only the organization information which is relevant to this direction is provided. In addition, the broadcast radio transmission station RFS has an interface device IS for interchanging organization and control information with a central server CPC-S.

The central server CPC-S, shown by way of example, likewise has an interface device IS for communicating with broadcast radio transmission stations RFS. The interface device IS is used by the server CPC-S to transfer organization information relating to the broadcast radio transmission station RFS and to receive feedback information, as described above, for example, from the broadcast radio transmission station RFS and/or system stations, for example the base station BS shown or the network access point AP, which in this case likewise need to have appropriate interface devices IS (not shown). In addition, the server CPC-S has a database DB in which organization information is stored with a link to respective location information. A control device ST in the server CPC-S controls the transfer and reception of organization information via the interface device IS, for example, and update of organization information on the basis of feedback information or information from other sources, for example information provided by operators about network planning, particularly about setup and removal of system stations. By controlling the transfer of organization information relating to the station which transmits the cross-system channel CPC, it is also possible to control the load distribution in targeted fashion, for example. If the WLAN system in FIG. 1 signals that there is currently an overload situation in the radio cells of the system, for example, then transmission of organization information relating to this system can be suppressed in targeted fashion until the system can support setup of new connections again. This makes it advantageously possible to prevent subscriber terminals from making attempts at accessing an already overloaded system and hence additionally increasing the system load.

System stations, such as the base station BS, shown by way of example, in a GSM system in the network access points AP, each have transmission devices SE and reception devices EE for communication with subscriber terminals UE via the radio interface. By way of example, the transmission device SE and an antenna device are used to transmit the broadcast channel BCCH and the pilot channel PCH from these stations on the basis of the supported system standard GSM or WLAN. According to the description above, it is also conceivable for the cross-system channel CPC to be transmitted by the system stations BS, AP. According to the examples described above, the reception devices EE can receive not only the known standard-compliant channels but also feedback information from the subscriber terminal UE in a feedback channel FC, which the stations then transfer directly or via the broadcast radio transmission station RFS to the server CPC-S. The system stations BS, AP may also themselves have devices for generating feedback information. Thus, the base station BS may have, by way of example, a reception device for receiving both the cross-system channel CPC and the pilot channel PCH of the network access point AP. Following comparison of the organization information transferred in the cross-system channel CPC and relating to a potential availability of the WLAN system at the location of the base station BS with measurements performed in respect of an actual receivability of the pilot channel PCH in an evaluation device AW of the base station BS, an appropriate piece of feedback information is generated and signaled to the server CPC-S. The network access point AP may be equipped in the same way with reception and evaluation devices of this kind.

In the same way as the system stations BS, AP, the subscriber terminal UE has transmission devices SE and reception devices EE for sending and receiving signals via the radio interface. In particular, the reception device EE is designed to receive the cross-system channel CPC and also signals based on the standards GSM and WLAN supported by the base station BS and the network access point AP. In the same way, the transmission device SE is designed for communication with the system stations BS, AP on the basis of the supported standards GSM and WLAN, and also for transfer of feedback information in a feedback channel FC to a system station BS or the broadcast radio transmission station RFS. In line with the description above, feedback information is generated in an evaluation device AW of the subscriber terminal UE, which is preferably also designed to evaluate the received organization information and to select a suitable system or a suitable station for setting up a communication link.

All the names and designations of radio standards and system components which are used to describe the figures should not be understood as limiting the invention to these standards. Rather, the method and devices can be used in a wide variety of systems and configurations of systems.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method of transferring organization information relating to at least two communication systems in a cross-system channel, the method comprising:
   transmitting the cross-system channel directionally via a radio interface;
   selecting organization information to be transferred based on the direction of the cross-system channel transmission; and
   transferring the selected organization information in the cross-system channel, wherein
   the cross-system channel is split into at least two subchannels, a first subchannel being used to transfer organization information about universally-implemented communication systems, and a second subchannel being used to transfer organization information about locally-implemented communication systems.

2. The method according to claim 1, wherein the organization information transferred in the cross-system channel is at least pointers to communication-system-specific and/or operator-specific channels.

3. The method according to claim 1, wherein the cross-system channel is transmitted by at least one radio access device in a communication system and/or a broadcast radio transmission station in a public broadcast radio system or a private broadcast radio system.

4. The method according to claim 3, wherein a subscriber terminal receiving the cross-system channel compares the organization information in the cross-system channel with measurements performed by the subscriber terminal and signals ascertained differences to the broadcast radio transmission station transmitting the cross-system channel, and/or the at least one radio access device with a radio link to the subscriber terminal, in the communication system.

5. The method according to claim 1, wherein the directional transmission is affected by adaptive beamforming, a switched beam or sectorization.

6. The method according to claim 1, wherein the first subchannel is transmitted omnidirectionally and the second subchannel is transmitted directionally.

7. The method according to claim 1, wherein the first and second subchannels are transmitted in different frequency bands.

8. The method according to claim 1, wherein the cross-system channel is used to transfer information about a direction for the transmission.

9. The method according to claim 1, wherein the cross-system channel is used to transfer information concerning geographical arrangements of the radio communication systems.

10. A station to transfer organization information relating to at least two communication systems in a channel via a radio interface, the radio transmission station comprising:
    at least one transmission device transmitting the channel directionally; and
    a control device selecting the organization information to be transferred based on the direction of the channel transmission, wherein
    the cross-system channel is split into at least two subchannels, a first subchannel being used to transfer organization information about universally-implemented communication systems, and a second subchannel being used to transfer organization information about locally-implemented communication systems.

11. The station according to claim 10, further comprising at least one interface device interchanging organization information with a central device to manage the organization information.

12. The station according to claim 10, wherein the at least one transmission device has at least one smart antenna, an antenna array or sector antennas for the directional transmission of the channel.

13. The station according to claim 10, wherein the radio transmission station is a radio access device in a radio communication system or a broadcast radio transmission station in a public broadcast radio system or a private broadcast radio system.

14. A subscriber terminal, comprising:
- at least one reception device to receive at least one cross-system channel transmitted directionally by a station;
- an evaluation device evaluating organization information relating to at least two communication systems transferred in the cross-system channel and selecting a communication system; and
- a transmission device to transmit signals for access to the selected communication system, wherein
- the cross-system channel is split into at least two subchannels, a first subchannel being used to transfer organization information about universally-implemented communication systems, and a second subchannel being used to transfer organization information about locally-implemented communication systems.

15. The subscriber terminal according to claim 14, wherein the evaluation device compares received organization information in the cross-system channel with measurements performed by the at least one reception device concerning at least one transmission channel from at least one station, the transmission device signaling ascertained results for the comparison to the station transmitting the cross-system channel and/or to a station having a radio link to the subscriber terminal in a communication system.

16. A method of receiving organization information relating to at least two communications systems in a cross-system channel, the method comprising:
- receiving at least one cross-system channel directionally by a station;
- evaluating the organization information relating to the at least two communications systems transferred in the at least one cross-system channel and selecting a communication system; and
- transmitting signals for access to the selected communication system, wherein
- the cross-system channel is split into at least two subchannels, a first subchannel being used to transfer organization information about universally-implemented communication systems, and a second subchannel being used to transfer organization information about locally-implemented communication systems.

* * * * *